Aug. 7, 1934.  W. M. GRANT  1,969,264
METHOD OF REDUCING METALS FROM OXIDIZED MATERIALS
Filed April 7, 1931
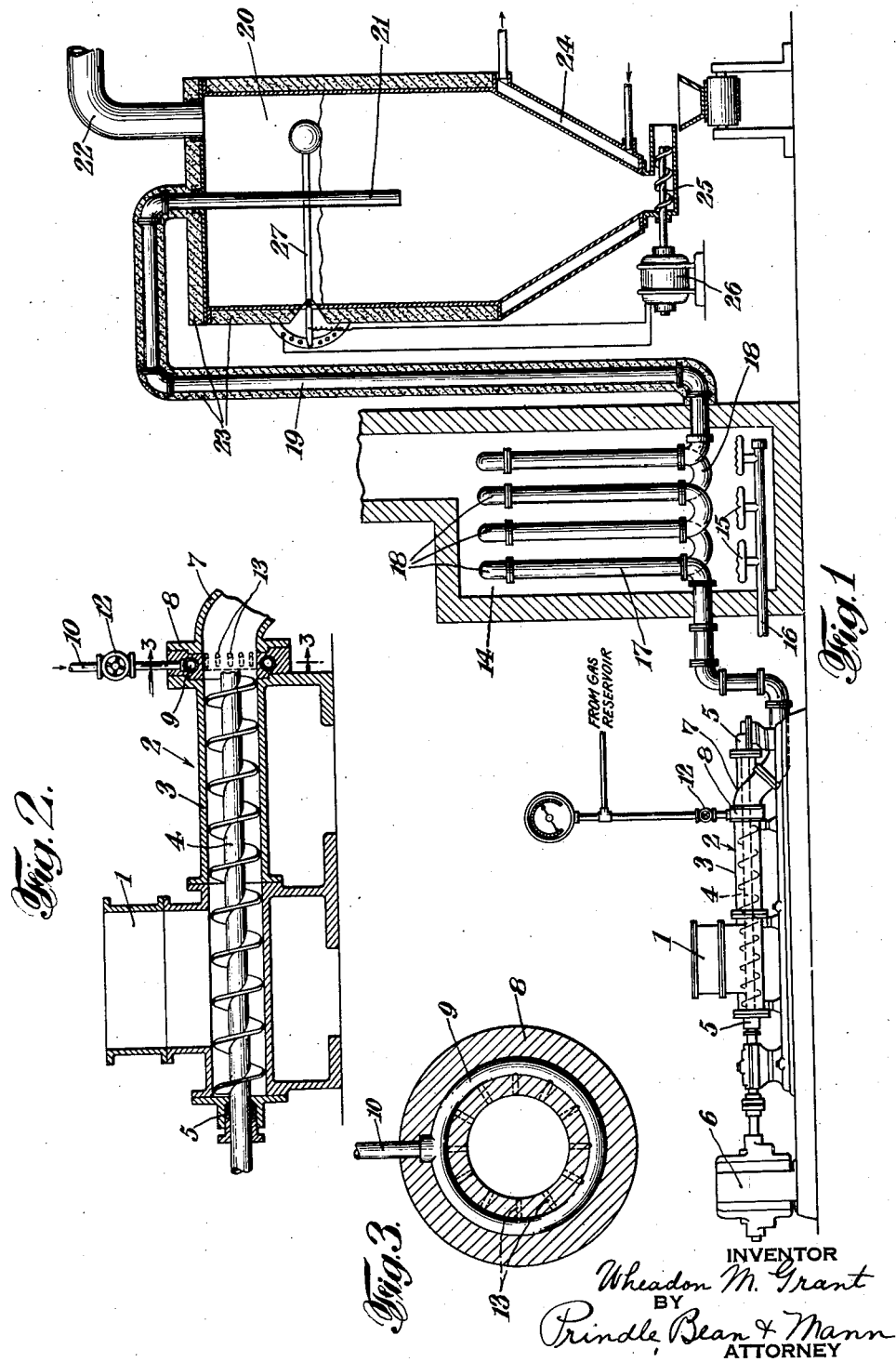

Patented Aug. 7, 1934

1,969,264

UNITED STATES PATENT OFFICE 1,969,264

METHOD OF REDUCING METALS FROM OXIDIZED MATERIALS

Wheadon M. Grant, Birmingham, Ala.

Application April 7, 1931, Serial No. 528,306

8 Claims. (Cl. 75—17)

This invention relates to a method and system of reducing metals from their oxides, and the primary purpose of the invention is the provision of such a method or process and system whereby metals may be rapidly and economically reduced from their oxides. Although this method may be applied to a number of different metals it is primarily intended for the reduction of iron and copper from their oxides.

Whether or not the ores to be treated occur in their natural state as oxides, they can be changed to oxides by roasting at a high temperature in the presence of air. The art of converting sulphides and carbonates to oxides is well known and forms no part of this invention. It is well known that if metallic oxides be heated to a sufficiently high temperature in the presence of a reducing gas such as carbon monoxide, the metallic oxide will be reduced to a metal with the simultaneous production of carbon dioxide. For any given particle of oxide being treated thus reaction begins at the surface and penetrates to the center of the particle if the particle is exposed to an atmosphere of carbon monoxide for a sufficient length of time. The rate of reduction is inversely proportional to the mass of the individual particle, and if the individual particle be sufficiently small, the temperature sufficiently high, and the atmosphere retained in a reducing condition, a reduction of the particle of metallic oxide to metal becomes practically instantaneous. It follows that if a given weight of metallic oxide can be sufficiently subdivided and each small particle reduced individually, the rate of reduction of the whole can be materially increased.

When carbon monoxide reacts upon a particle of metallic oxide carbon dioxide is produced. If, however, carbon is present in the same atmosphere, this carbon will reduce the carbon dioxide to carbon monoxide. At a temperature of 1000 C. carbon dioxide cannot exist in the presence of carbon, and if carbon be present all carbon dioxide formed by the reduction of metallic oxides will be instantly converted into carbon monoxide. The reduction of oxides of copper and iron begins at a lower temperature than 1000 C. but at this temperature reduction is complete if the oxide be exposed to an atmosphere of carbon monoxide for a sufficient length of time.

If the reduction of oxides be carried out at temperatures not in excess of 1000 C. the metal so produced will be spongy in character, and the non-metallic impurities will not have reached their fusion temperature. Others have attempted to reduce metals from their oxides at temperatures below that of fusion of the non-metallic constituents of the ore. Attempts have been made to heat mixtures of metallic oxides and carbonaceous materials in closed chambers. Other attempts have been made to heat oxides in rotary kilns by means of reducing flames inside the kilns. In neither of these systems has it been possible to treat large amounts of finely divided particles individually at a rapid rate or without some re-oxidation of the metal produced.

It has been found that if any finely divide material be forced by mechanical means under pressure into a pipe at a uniform rate and this dust be compacted into a relatively dense column for a short distance from the inlet and immediately beyond this zone of compression air or gas be introduced into this column at a uniform rate with uniform distribution, that the compacted column of dust becomes aerated or "fluidized", and the mixture of dust and gas then has many of the physical properties of a viscous liquid, and has considerably less density than the column of compacted dust had before aeration. This method of transporting finely divided materials is in wide use and is not to be confused with systems in which materials are transported by suspension in a moving blast of air. Here the function of the air or gas is not to suspend the solid particles but rather to isolate each particle from all other particles, and by reducing the contact between the individual particles it permits the aggregation of particles to flow hundreds and even thousands of feet through the pipe at relatively slow velocity and propelled entirely by the feed mechanism at the inlet. The pipe may be carried in any direction and around corners. This "fluidized" dust continues to act as a fluid for some time after discharge from the pipe and gives up its included gas so slowly that dust is not apparent. Under normal conditions it is customary to inject about four volumes of gas to each volume of solid material being conveyed, but many times this amount of gas may be used and the system will still function perfectly.

For the reduction of any given ore it is necessary that this ore should be in oxidized form by which is meant any compound other than the sulphide, and if the ore is not in oxidized form in its natural state it must be roasted to oxide by any standard process, and then while absolutely dry must be reduced to its finely divided condition and mixed with pulverized coal, coke, charcoal, or any suitable carbonaceous material. The percentage of coal in the mixture will be approximately one-third of the weight of the metal to be reduced as determined by the assay of the ore being treated. This dry, pulverized, properly proportioned mixture of oxidized ore and carbonaceous or similar reducing material will be hereinafter referred to as oxidized material.

My process involves the reduction of separate individual finely divided particles of oxidized material while any aggregation of such particles is being moved in an aerated condition through a pipe heated to the desired temperature of reduction, and is more fully illustrated in the drawing.

In the drawing:

Figure 1 represents a combination, diagrammatic and sectional view illustrating one apparatus or system for carrying out the method or process of this invention.

Figure 2 represents a longitudinal cross-sectional view of the feeding and propelling or pressure-applying apparatus.

Figure 3 is a transverse cross-section taken substantially on line 3—3 on a slightly enlarged scale.

Referring now to the drawing, numeral 1 designates a bin or other suitable receptacle in which is stored oxidized material which has been very finely divided and which is fed by gravity into a propelling or pressure-applying mechanism 2, which includes a cylindrical barrel or tube 3, within which is positioned a spiral feed screw 4, supported by bearings 5 and driven by motor 6 or other suitable source of power. The pitch of the flights of the spiral feed screw becomes less toward its discharge end so as to cause the material to be compacted more at the discharge end, which connects to and discharges the material into an elongated pipe or tube or conduit 7. Located between the cylindrical barrel or tube 3 and the pipe or conduit 7 is an aerating ring or construction 8 having an annular gas receiving passage 9, which is connected by a suitable pipe or conduit 10 with a suitable reservoir or storage receptacle (not shown), regulating valve 12 being provided in said pipe or conduit. A plurality of perforations or orifices 13 are provided in the pipe or conduit 7, which communicate with the annular gas passage 9 so as to introduce a plurality of jets of gas into the column of compacted pulverized material being discharged from the barrel or tube 3. This gas then immediately penetrates entirely through the body of the finely divided oxidized material by means of the interstices between the individual particles of the material, separating these particles from each other so as to form a viscous column composed of a mixture of gas and solid particles, which is fluid and will flow into and through the pipe 7 and having apparent density less than that of the compacted column of solid material leaving the barrel or tube 3. The gas to be used is preferably carbon monoxide resulting from previous operation of the process.

Reference character 14 designates a suitable heating chamber or furnace which is maintained at any desired or necessary temperature by means of suitable burners 15 supplied with gas or other fuel through pipe 16 from any suitable source. The oxidized material is passed through this heating chamber or furnace within a continuation of the pipe 7. This continuation of the pipe 7 is in the form of a plurality of vertically arranged segments 17 which are connected in series by 180° bends or elbows 18 top and bottom, so that this material has an extended path or movement through the segments up and down, while being subjected to the heat of the chamber or furnace. During this passage the metallic oxides in the material are reduced to metals and the temperature in the furnace and the length of the segments of the extension of the pipe 7 within the furnace and the velocity or speed of the material in passing therethrough are regulated to give the desired reducing effect.

The extension of pipe 7 is then continued beyond the furnace 14 as at 19 and discharged into a settling chamber 20, the end 21 of this extension 19 terminating at a distance removed from the top of the settling chamber and in the center thereof. In the operation of this system the material is maintained at a higher level than the terminus of the extension 21. The diameter of the settling chamber 20 is large enough to permit the material to gradually settle and resolve itself into its original state of unmixed solids and gas and permits the gas to pass out of the settling chamber 20 through the gas main 22 without carrying dust with it.

In order to prolong the time during which reduction of metallic oxides may take place, the upper part of the settling chamber 20 and the extension 19 of pipe 7 between the furnace 14 and the settling chamber 20 are heavily insulated as indicated at 23. The solid material which is free of gas in the settling chamber 20 is cooled below the temperature at which the reduced metal would be reoxidized by contact with the atmosphere by means of the water jacket 24 surrounding the lower part of the settling chamber 20 and it is removed and discharged from said settling chamber 20 by means of the discharing or extracting screw 25. This discharge mechanism 25 is driven by means of a suitable motor 26, operation of which is automatically controlled by the float regulator 27 so as to maintain the upper surface of the material in the settling chamber 20 at a constant level.

The mechanism described discloses one form of apparatus that may be used to carry out my process, but it will be understood that other types of apparatus may be employed for practicing the invention and that various changes may be made in the construction and arrangement of the apparatus without departing from the principle of the invention as defined in the appended claims. This principle involves supplying the material to be reduced in a finely divided form to a reduction tube, subjecting the material to pressure, introducing a gas into the material in the system to render it fluent or mobile so that the pressure will be effective to cause the conveyance of the material throughout the system, heating the reduction tube to a temperature that will cause the material to be reduced within the reduction tube and separating the solid material after reduction from the gas.

In the practice of the process the chamber 20 is half filled with previously treated material, all air is excluded from the system and replaced preferably by a gas resulting from previous operation and the entire system heated up to the desired temperature of reduction, gas, preferably from previous operation, is turned on by valve 12 and then the material in bin 1 is fed into the system in a compressed state by screw 4. When the material mixes with the gas it becomes fluent and mobile and passes into the reduction tube, having the character of a viscous fluid. For any given material there is a minimum velocity of flow that should at all times be exceeded in order that the solid and gas may be kept uniformly mixed and the fluent condition maintained. The average velocity of flow in the reduction tube will approximate 200 feet per minute. Practically all the force moving the material throughout the system is due to the pressure applied to the material at the inlet by the feed screw and the application of such pressure is essential to moving the material and the compression of such material is essential to prevent gas escaping through the feed screw. In other words, the material is fed through the tube by mechanical means as distinguished from a gravity feeding means.

As the "fluidized" material moves through the tube its center moves faster than the area in contact with the walls so that a turbulent condition exists at all times. This has the effect of continuously re-mixing the gas and solid particles, thereby maintaining fluidity, and also periodically brings each particle to the outer surface of the stream and into contact with the tube wall. This thorough mixing insures a uniformity of temperature between the different particles and the gas at any given point in its progress through the reduction tube. When a sufficiently high temperature has been attained in the material the carbon monoxide gas reacts with the metal oxides and reduces these oxides to metal with the formation of carbon dioxide. Due to the turbulence of the material flowing through the tube the carbon dioxide so produced is brought into contact with particles of coal or other carbonaceous material and is immediately reduced to carbon monoxide. When the temperature of the material in the tube has reached 1000° C. it is impossible for carbon dioxide to exist in the presence of carbon and the gas at this temperature will be almost wholly carbon monoxide. Due to the fact that each individual particle of oxidized material is extremely small and is separated from all other particles by an envelope of carbon monoxide gas a reduction of the metallic oxides to metal is a matter of seconds only after sufficiently high temperature has been attained and the desired reducing effect is obtained if the stream of material reaches the desired temperature at the instant of discharge from the furnace. The reduction of both iron and copper oxides is slightly exothermic and before being discharged from the settling chamber the material has ample opportunity to remain at a sufficiently high temperature for a sufficient length of time to insure the complete reduction of its oxide content.

The separation of the reduced metal from the accompanying non-metallic material after the whole has been discharged from the settling chamber forms no part of this invention. There exist several well known methods of separating metallic iron from other impurities by magnetic means. The leaching of metallic copper from earthy material by ammonia or acids is widely practiced, as is also the flotation of metallic copper from earthy materials. This invention is concerned only with a method of quickly, cheaply and efficiently reducing metal oxides to a metallic state without fusing or slagging the earthy materials accompanying the metallic oxides.

I claim:

1. The method of reducing metals from their oxides in a closed tube which comprises continuously admitting oxidized material to and advancing the material through a portion of said tube and continuously increasing the pressure applied to the material as it is advanced to form a zone of maximum density in which the material is closely compacted to form a continuous seal of material to check the counterflow of gas under pressure toward the point of admission of the material, admitting a gas under pressure to said zone to render the material fluent at a point closely adjacent to but slightly beyond the point of formation of said seal, and conveying the material through said tube by the resultant pressure thus applied to it, heating the tube beyond the point of gas inlet to the desired temperature of reduction, reducing the material while passing through the tube, and separating the solid and gaseous products of reduction.

2. The method of reducing metals from their oxides in an elongated closed tube which consists in supplying pulverized oxidized material continuously to the tube at a supply point therein, subjecting the material adjacent to the supply point to pressure and injecting a gas into the tube at a point removed from the supply point whereby the material in advance of the point of application of the pressure is areated to make it mobile, and the entire body of material is moved through the length of the tube in a continuous stream, heating a substantial portion of the length of the tube to a temperature sufficiently high to bring about the desired degree of reduction of the stream of material during its passage through the reduction tube, and separating the solid and gaseous products of reduction.

3. The method of reducing metals from their oxides which consists in continuously supplying oxidized materials in pulverized form to an elongated reduction tube; applying pressure to the material adjacent to the supply point to advance the material within and through the tube and cause it substantially to fill the tube, an injecting gas under pressure into the tube at a point removed from the supply point, whereby the material beyond the point of application of pressure is areated to make it mobile and whereby the entire body of material is moved through the tube by the pressure applied to it and by expansion of the gas, maintaining a substantial portion of the tube at such a temperature that the metallic oxide content of the material will be reduced to metallic form, and separating the solid and gaseous constituents of the material after passage through the reduction tube.

4. The method of reducing metals from their oxides which comprises continuously supplying oxidized material in pulverized form to an elongated tube, continuously applying pressure to the material as it is so supplied, which pressure is transmitted throughout the material itself so that all the material throughout the entire length of the tube is subjected to pressure, injecting a gas into the material to increase the mobility of the material, passing the mobilized material as a viscous fluid through the tube, and maintaining a substantial portion of the length of the tube at a temperature which will cause the metallic oxide content of the material to be reduced to metallic form while passing through the tube.

5. A method of reducing metals from an oxidized form, which comprises, introducing into a tube externally heated at a zone to the temperature of reduction an aggregate of finely divided particles of oxidized material containing ore material and a reducing agent, mechanically feeding such material through the tube under pressure and also introducing into such tube and into the ore material a gas under pressure whereby a viscous fluid is produced and each particle is separated from all other particles by the gas under pressure, and while passing through the heated zone reducing each separate particle individually while so separated from its fellow particles.

6. In a method of reducing metals from an oxidized form, the step of mixing pulverized oxidized material including ore material and a reducing agent, and gas, in such proportions that the mixture has the physical properties of a viscous fluid, and forcing such mixture into and through a tube externally heated at a zone to the temperature of reduction by pressure mechanically applied outside the heated zone.

7. In a method of reducing metals from an oxidized form, the step of mixing pulverized oxidized material including ore material and a reducing agent, and gas, in such proportions and under such pressure that the mixture has the physical properties of a viscous fluid, and passing such mixture under mechanically applied pressure through an elongated tube externally heated at a zone to the temperature of reduction of the material.

8. In a method of reducing metals from an oxidized form, the step of mixing pulverized oxidized material including ore material and a reducing agent, and gas, in such proportions and under pressure continuously applied so that the mixture has the physical properties of a viscous fluid, and passing such mixture under mechanically applied pressure continuously through an elongated tube heated at a zone to the temperature of reduction of such material.

WHEADON M. GRANT.